Sept. 24, 1957
M. G. MATHEWS
2,807,398
FISH POLE CARRIER
Filed Dec. 3, 1952
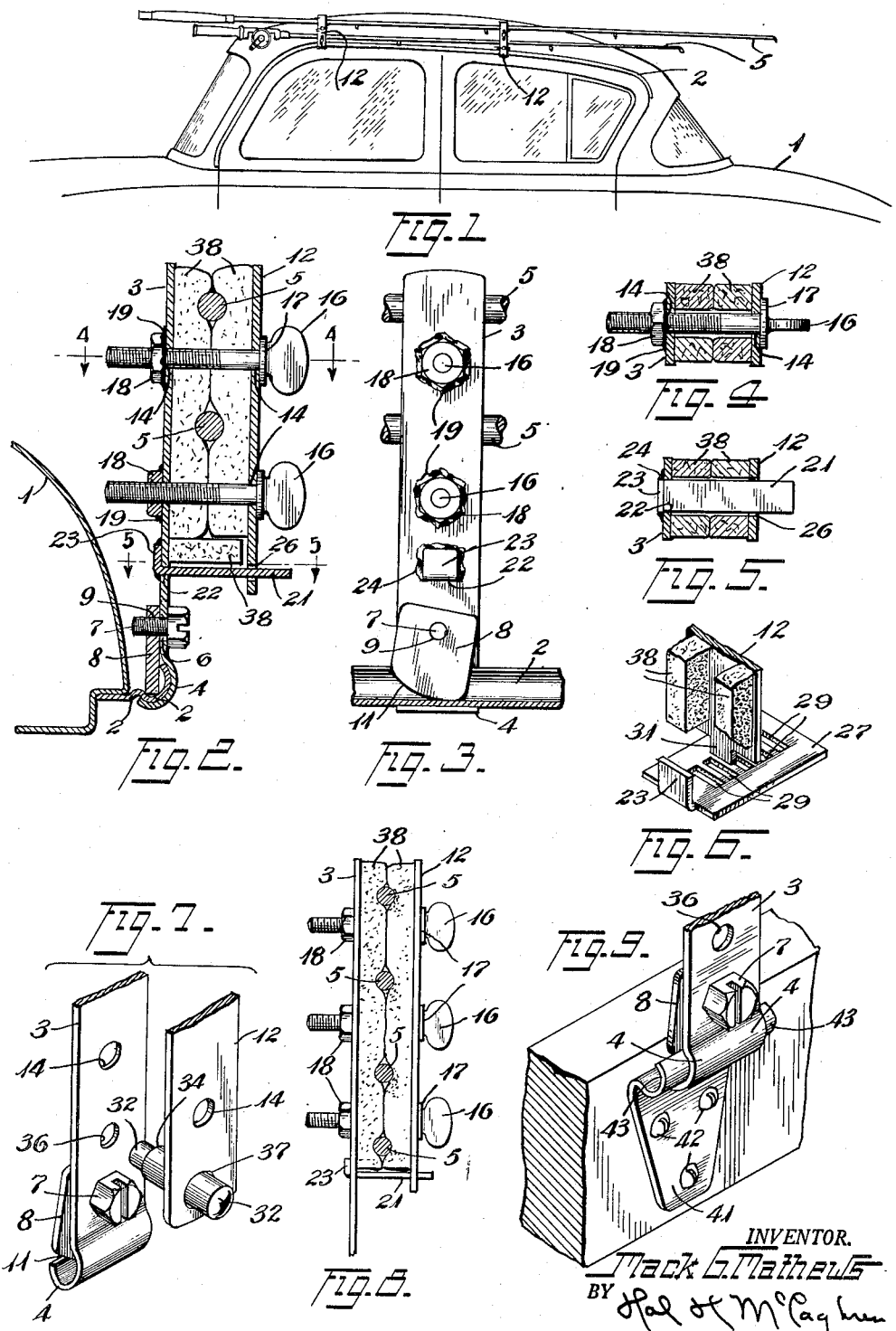
INVENTOR.
Mack G. Mathews
BY Hal H. McCaghren
attorney

United States Patent Office 2,807,398
Patented Sept. 24, 1957

2,807,398

FISH POLE CARRIER

Mack G. Mathews, Palm Beach, Fla.

Application December 3, 1952, Serial No. 323,852

2 Claims. (Cl. 224—42.1)

This invention relates to fish pole carriers and supports.

Fish pole carriers have previously been used to support the poles exteriorly of an automobile by carrier devices secured to the gutter provided on the automobile. These devices generally employ screw clamps to secure the carrier to the gutter and flexible ties to secure the fish pole in support brackets of the carrier device.

An object of this invention is to provide a fish pole carrier with cam means securing the carrier to the gutter.

Another object of this invention is to provide a fish pole carrier with cam means securing the carrier to a support member, and clamp means comprising a fixed jaw and movable jaw clamping fish poles therebetween.

Another object of this invention is to provide a fish pole carrier of the class described which can be easily, quickly and removably secured to a gutter or other arcuate channel without special tools.

Another object of this invention is to provide a fish pole carrier of the class described with threaded engaging elements actuating said fixed and movable jaw into clamping relationship.

Another object of this invention is to provide a fish pole carrier which will support and clamp a plurality of fish poles of different diameters.

Another object of this invention is to provide a device of the class described which will protect fish poles in transit on automobiles or boats or the like, and also provide convenient protective storage means.

A further object of this invention is to provide a device of the class described which will be simple and economical in construction employing a minimum of parts and unskilled workmanship, and be durable and efficient in use.

The foregoing and other objects of this invention will be more apparent from reading the following specification, in conjunction with the drawings forming a part thereof, wherein:

Fig. 1 is a front elevation view of a pair of fish pole carriers of this invention, with fish poles clamped therein, secured to the gutter of an automobile;

Fig. 2 is a vertical cross-sectional view of one embodiment of a device of this invention as secured to an automobile gutter, parts shown in elevation for clarity;

Fig. 3 is a rear side elevation of the device of Fig. 2 attached to the gutter, partially shown in section;

Fig. 4 is a horizontal cross-sectional view taken along line 4—4 of Fig. 2;

Fig. 5 is a horizontal cross-sectional view taken along line 5—5 of Fig. 2;

Fig. 6 is a perspective view of a modification of the movable jaw and support guide;

Fig. 7 is a perspective view in disassembly of modified guide means interconnecting the fixed and movable jaws, parts removed for clarity;

Fig. 8 is a side elevation of the pole clamp means of the device of this invention illustrating its adaptability to multiple pole carrying and storing; and Fig. 9 is a perspective view of cam securing means and an arcuate bracket for supporting the device of this invention when attached to a boat, or display, or storage.

Referring to the drawings, wherein like parts are given the same reference numeral, an automobile 1 is generally represented having a U-shaped gutter 2, to which the device of this invention may be secured by cam action clamp means to hold fish poles 5. The device of this invention is employed in pairs, as illustrated in Fig. 1, but in so far as they are identical in construction, the description will be limited to a single device and modifications thereof.

The device has a stationary jaw or plate 3 of a suitable rigid material, preferably rectangular metal bar stock, such as steel, brass and aluminum, and plastics, such as thermosetting synthetic resins, particularly filled or laminated melamine resin bars. This jaw 3 has the lower extremity thereof formed as an arcuate section or hook 4 adapted to fit under the gutter 2 and substantially conform to the curvature thereof. An aperture 6 is provided in the jaw 3 above the arcuate section 4 and adapted to receive a flanged or headed bolt 7, preferably a slotted-head bolt, which threadedly engages a cam member 8 adapted to be received in the interior of the gutter 2 and in cooperation with the arcuate section 4 cam-clamp the gutter 2 therebetween vertically and horizontally. The aperture 6 is preferably elongated vertically to provide additional adjustment vertically whereby the cam clamping arrangement may be employed on all automobiles without modification. The flanged or headed bolt 7, by threaded engagement with the cam member 8, has the flange or head thereof abut the jaw 3 because the aperture 6 has a smaller cross-section than the flange or head of the bolt 7 in so far as the threaded section of bolt 7 is substantially the same cross-sectional size as the horizontal cross-section of the aperture 6 to prevent lateral motion. The threaded engagement section of the cam member 8 may be an eccentric tapped aperture 9, as illustrated, or an eccentric aperture with a nut spot-welded to the cam 8 in alignment with the aperture, as described hereinafter with respect to the threaded engagement of elements connecting the stationary and movable jaws.

The cam member 8 functions in cam action by providing the aperture 9 off-center, or eccentrically as it is known in the art, and providing the lower end or cam surface 11 in an arcuate shape, whereby the threaded engagement of the bolt 7 and cam member 8 tightens the cam surface 11 against the gutter 2, which is already abutting the arcuate section 4 of the stationary jaw 3.

In spaced relationship with the stationary jaw 3 is a movable jaw or plate 12, preferably rigid, connected to the stationary jaw 3 through threaded engaging clamping elements. This movable jaw 12 is preferably of the same bar stock as the stationary jaw 3, and may be stamped therewith and severed therefrom in one operation. Aligned apertures 14 are provided in these jaws 3 and 12 adapted to receive a thumb screw bolt 16 provided with an annular flange 17. A nut 18 is spot-welded 19 to the stationary jaw 3 in alignment with the aperture 14 to threadedly engage the thumb screw bolt 16. The flange 17 abuts the movable jaw 12 while the thumb screw bolt 16 engages the nut 18 actuating the clamp formed by the jaws 3 and 12. A pair of these thumb screw bolts 16 operating independently permits different diameter fish poles to be clamped therebetween at different elevations due to divergence of the plane of the jaws 3 and 12 rather than parallelism of the jaws when poles of the same diameter are clamped.

The apertures 12 in the stationary jaw 3 may be tapped, as illustrated for aperture 9, rather than welding nuts thereover, but economy of construction renders nut welding more desirable.

An L-shaped guide and pole support member 21 extends outwardly from and perpendicular to the stationary jaw 3 and cooperates with elements associated with the movable jaw 12 to function as a guide therefor and also supports the bottom fish pole. This guide 21 may be welded to the stationary jaw 3, but the preferred method of attaching is to provide an aperture 22 in the jaw 3 into which an end 23 of the guide 21 is inserted and rotated to abut the jaw 3 thus leaving the guide 21 perpendicular to jaw 3 and held against downward movement. The end 23 may be spot-welded 24 to the jaw. The movable jaw 12 has an aperture 26 adapted to receive the guide 21.

Modification of guide members are illustrated in Figs. 6 and 7. In Fig. 6, an L-shaped guide similar to that above described has a horizontal section 27, vertical reduced end 28, and a plurality of parallel transverse apertures 29 adapted to receive a reduced end 31 of the movable jaw 12. In this arrangement, only one thumbscrew bolt 16 is necessary because the apertures 29 and end 31 serve as an adjustable pivot.

In Fig. 7, a rod 32 having a reduced end to provide a shoulder 34 is employed as a guide. An aperture 36 is provided in the stationary jaw 3 to receive the reduced end 33 in press-fit relationship, and the reduced end 33 may then be peened in the aperture 36 if so desired. An aperture 37 is provided in the movable jaw 12 adapted to loosely receive the rod 32.

A plurality of guides 21, 27 and 32 may be used for elongated carriers adapted to carry or store many fish poles.

Each of the jaws 3 and 12 have, on the inside face, a vertical strip 38 of cellular resilient material to abut each other and deform when a fish pole is clamped therebetween. Such a material as foam rubber, sponge rubber and the like, secured on each side of the apertures 14 is most satisfactory. And a similar, but horizontal, strip 38 is provided on top of guide 21, and positioned to be received between the vertical strips of each jaw.

When the device is to be removably clamped to boat 40 or other similar wall structure, such as a garage or game room, a bracket 41 is employed. This bracket 41 may be secured to the boat 40 in any suitable manner, preferably with screws 42. The bracket 41 has the free end 43 thereof turned outwardly and substantially U-shaped to resemble a horizontal gutter 2 to cooperate with the cam clamping elements as previously described.

In Fig. 8, there is illustrated a multiple thumb screw bolt device. This arrangement is desirable only where the movable jaw 12 is semi-flexible, such as a spring steel plate, and many poles are to be supported by the device.

In operation the device is quite simple. The arcuate end 4 of the stationary jaw is positioned under the gutter 2 or arcuate section 43 of bracket 40, the cam element 8 rotated into abutment with the interior of the arcuate end and also the side of said cam clamps the gutter side against the jaw 3, and the bolt 7 tightened by threaded engagement with the cam element 8. The fish poles 5 are inserted between the jaws 3 and 12, and the thumb screw bolts 16 tightened by threaded engagement with the stationary jaw 3 to clamp the poles 5 therebetween and cushioned by the cellular resilient material 38. If poles of different diameters are clamped, the smaller ones should be on the bottom to provide a V-shaped carrier when all poles are properly clamped between the jaws 3 and 12.

When the arrangement of Fig. 6 is employed, only one thumb screw bolt 16 is necessary. The reduced end 31 of the movable jaw 12 is inserted at an angle in the proper aperture 29 to provide a clamping action when the opposed end of the jaw 12 is forced towards the stationary jaw 3.

This invention has been described in detail, but it is clearly understood that the invention is not so limited. Many changes can be made therein without departing from the spirit and scope thereof, as defined in the appended claims.

Having thus described the invention, what is claimed as new and desired to secure by grant of United States Letters Patent is:

1. A device for holding a fishing rod adapted to be clamped to an elongated gutter trough curving transversely outwardly and upwardly from an automobile top comprising a stationary jaw, an arcuate end portion provided on said jaw and abutting the outer periphery of the automobile curved gutter, a cam element positioned inside the curved gutter trough and having a cam face thereof abutting the bottom of said gutter trough and another face thereof abutting the upwardly extending portion of said trough, threaded engaging means fastening said stationary jaw to said cam element and clamping said outwardly and upwardly curving gutter trough therebetween, while clamping said gutter between said jaw and said cam element the said cam face is urged in cammed abutting relation with the bottom of said trough of the said gutter, a movable jaw in spaced relationship with said stationary jaw, one of said jaws having a substantially perpendicular projection extending therefrom and engaging the other said jaw in supporting relationship, said jaws being positionable in parallel planes and in converging planes along their longitudinal axes, a plurality of individually adjustable threaded engaging means varying the spaced relationship between said jaws to clamp fishing poles therebetween.

2. A device for holding a fishing rod adapted to be clamped to an elongated gutter trough curving transversely outwardly and upwardly from an automobile top comprising a stationary jaw, an arcuate end portion provided on said jaw and abutting the outer periphery of the automobile curved gutter, a cam element positioned inside the curved gutter trough and having a cam face thereof abutting the bottom of said gutter trough and another face thereof abutting the upwardly extending portion of said trough, threaded engaging means fastening said stationary jaw to said cam element and clamping said outwardly and upwardly curving gutter trough therebetween, while clamping said gutter between said jaw and said cam element the said cam face is urged in cammed abutting relation with the bottom of said trough of the said gutter, a movable jaw in spaced relationship with said stationary jaw, a projection extending substantially perpendicular from said stationary jaw, an aperture in said movable jaw near the lower end thereof receiving said projection in slidable relationship, and a plurality of spaced clamping bolts extending through said jaws to clamp fishing poles between said jaws and between said bolts.

References Cited in the file of this patent

UNITED STATES PATENTS

| | | |
|---|---|---|
| 612,048 | Miller | Oct. 11, 1898 |
| 632,858 | Waibel | Sept. 12, 1899 |
| 923,596 | Staples | June 1, 1909 |
| 1,996,303 | McConnell | Apr. 2, 1935 |
| 2,514,266 | Walslager | July 4, 1950 |
| 2,529,285 | Felton | Nov. 7, 1950 |
| 2,594,231 | Squiers | Apr. 22, 1952 |
| 2,603,394 | Beck | July 15, 1952 |
| 2,610,085 | Zeeb | Sept. 9, 1952 |
| 2,682,982 | Fischer | July 6, 1954 |
| 2,717,751 | Kusiv | Sept. 13, 1955 |
| 2,718,370 | Carrier | Sept. 20, 1955 |